United States Patent Office 3,840,457
Patented Oct. 8, 1974

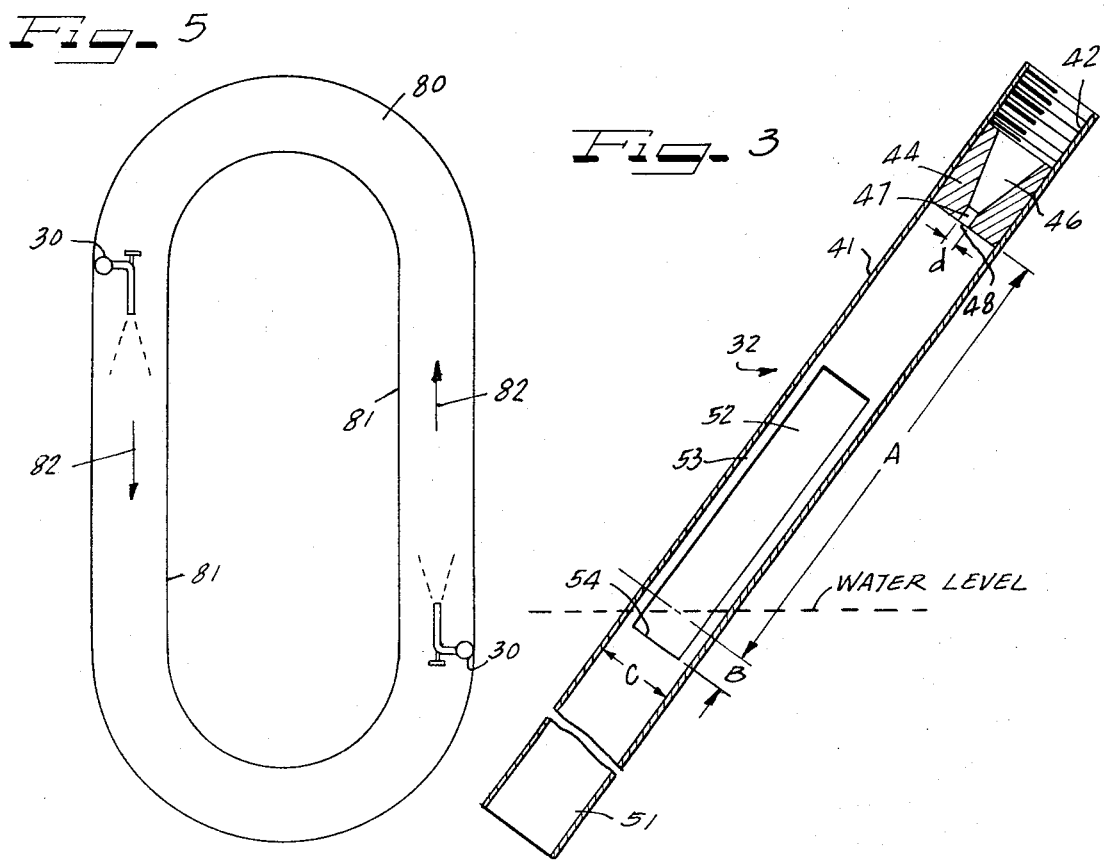
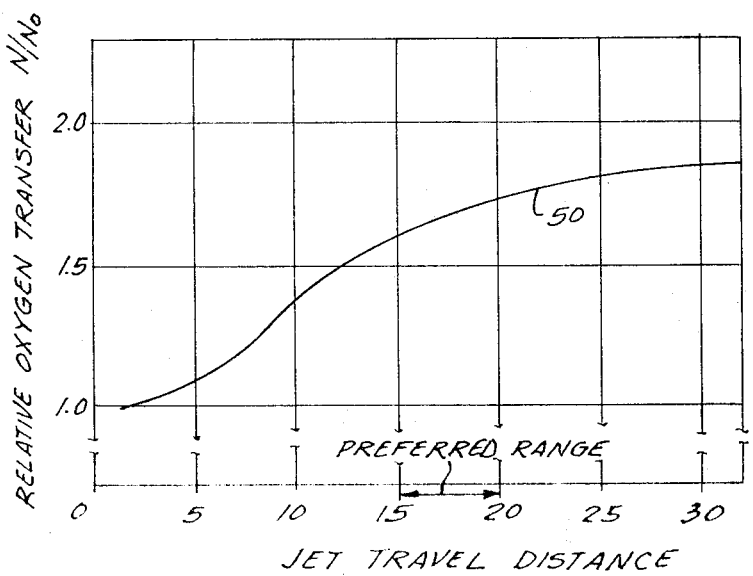

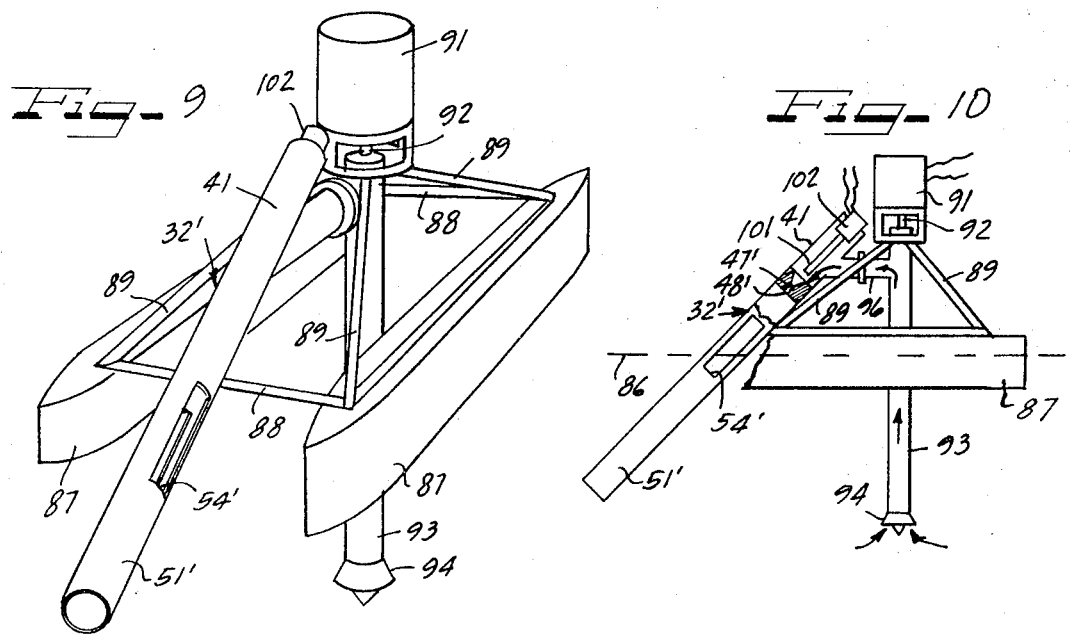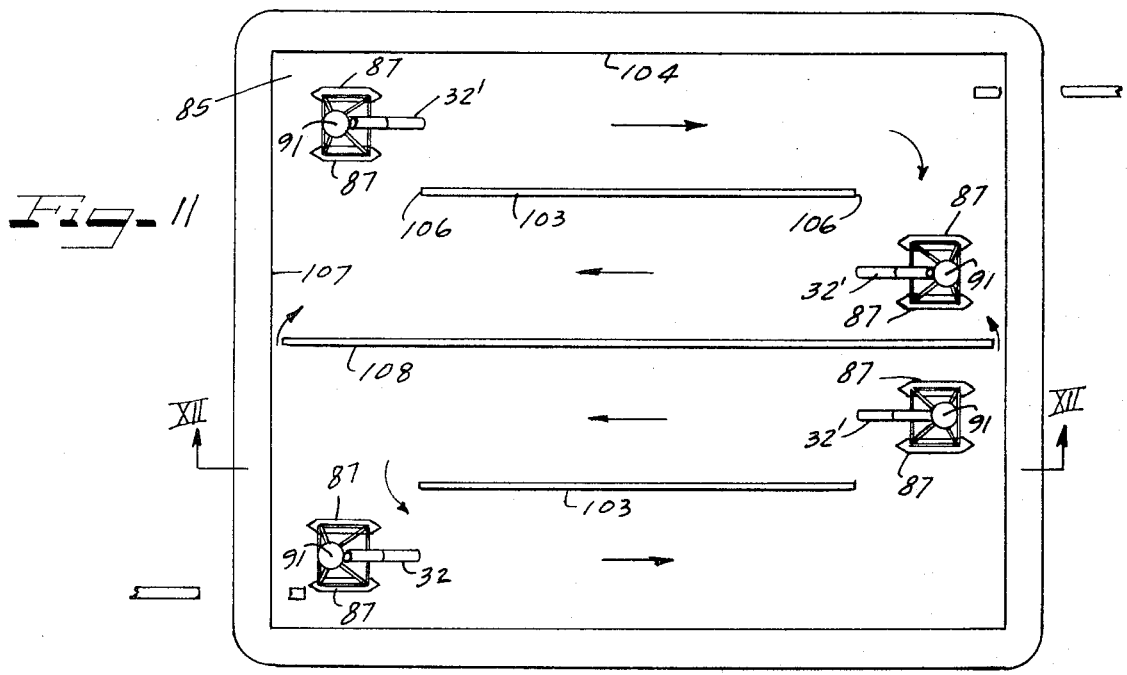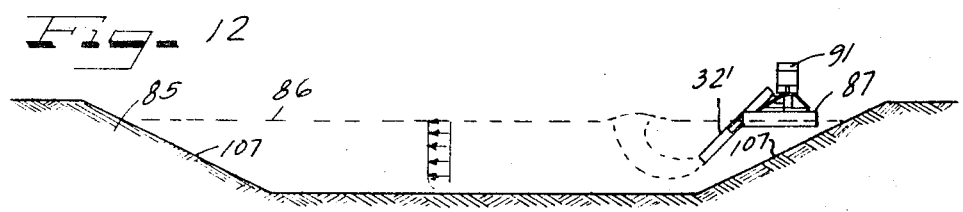

3,840,457
METHOD AND APPARATUS FOR TREATING
ANIMAL WASTE
George E. Wilson, Sterling, Ill., assignor to Houdaille
Industries, Inc., Buffalo, N.Y.
Filed Oct. 4, 1971, Ser. No. 186,294
Int. Cl. C02c 1/10
U.S. Cl. 210—14      12 Claims

ABSTRACT OF THE DISCLOSURE

A system for storing and treating a slurry of animal waste suspended in water includes an apparatus for oxygenating the slurry at a rate sufficient to reduce obnoxious odor without excess foaming by aspirating an admixture of ambient atmosphere and surface fluid in the slurry. The hydraulic transportation of the treated slurry to a point of use is enhanced by diluting the slurry to a concentration selected to provide a minimum pump head.

BACKGROUND OF THE INVENTION

Field of the Invention

This invention relates generally to the field of liquid waste treatment and more particularly refers to a method and apparatus for deodorizing a stored slurry of animal waste and water and for enhancing the hydraulic transportation of the slurry to a point of use.

Description of the Prior Art

It has been found that surface irrigation of a slurry of liquid animal and cannery waste will accomplish total treatment of the waste products. If the waste is applied to a field without puddling, odors and other nuisance conditions are avoided. However, surface irrigation has not been widely utilized for treating certain kinds of waste liquid, such as, for example, liquid animal waste, because the requisite storage prior to spreading results in a malodorous material which generates nuisance conditions.

The nuisance conditions result from the production of malodorous gases and vapors, which are products of anaerobic and not aerobic microbial metabolism. The anaerobic metabolism may be inhibited by the presence of oxygen. Periodic aeration or oxygenation of a potentially anaerobic liquid waste accomplishes the desired inhibition of the anaerobic metabolism.

While the aeration of the stored slurry may be accomplished with conventional aspirators for dissolving gaseous oxygen into the slurry, prior art aspirators have high power consumption requirements.

Also, the use of surface irrigation for treating animal waste is particularly adaptable to agricultural situations wherein waste produced by farm animals on a feed lot or within a building are collected and stored in troughs for periodic transportation to a spreading area or field. In feeding lots and buildings of that nature, the animal waste normally passes through floor slots into the collection trough. Thus, the aeration of the slurry stored within the trough must be balanced to accomplish positive odor control with a minimum production of foam which may rise through the slots and enter feeding trays.

Also, to obtain optimum use of the surface irrigation technique in agricultural situations, it is desirable to preserve the fertilizing value of the waste.

SUMMARY OF THE INVENTION

An animal waste storage and treatment system embodying the principles of the present invention deodorizes a slurry of animal waste and water by oxygenating the slurry at a rate selected relative to the oxygen demand of the waste input for inhibiting anaerobic metabolism without producing excessive amounts of foam. Periodically, a portion of the slurry is transported from a storage trough to a spreading area or field and spread on the field at a rate sufficiently low to prevent puddling.

In accordance with the principles of the present invention, the system incorporates a unitary mechanical apparatus for circulating the slurry at a velocity sufficient to maintain solid waste in suspension, oxygenates the slurry to inhibit the production of malodorous gases and vapors and hydraulically transports a portion of the stored slurry to a point of use, such as a spreading field or area. The unit generally comprises pump means, oxygenation means and hydraulic circuit means enabling dilution of the slurry in a manner to maximize the solid transport rate to the point of use.

The oxygenation means comprises a nozzle having an outlet through which fluid passes in the form of a jet stream and an aspirator tube having an inlet in axially spaced alignment with the nozzle outlet. In operation, the nozzle is spaced above the surface of the pooled slurry a distance to provide a jet travel distance in excess of 15 times the diameter of the nozzle outlet, thereby enhancing the transfer of oxygen per unit of energy expended. Also, the jet stream is utilized to aspirate an admixture of ambient atmosphere and surface fluid into the inlet end of the aspirator tube by disposing the inlet end of the aspirator below the surface of the slurry. With that arrangement, the oxygenating means of the present invention functions as a surface aspirator and has a substantially increased efficiency over that of conventional aspirators. Thus, the attractive features of conventionl aspirators, including high absorption efficiencies, absence of mechanical wearing parts, simple operation and high mixing efficiencies, are retained while the unattractive feature of high power consumption requirements is eliminated.

The hydraulic circuit for transporting the slurry to a point of use has a mixing chamber receiving fluid from the pump outlet and into which dilution water flows from a pressurized source, thereby to dilute the slurry for transportion to the point of use. Water containing a high concentration of suspended solids, such as a slurry of animal waste, behaves as a plastic fluid above a certain critical solid concentration. Often, diluting the solid concentrations increases the solids mass transport rate, due to the viscous effects.

In accordance with the principles of the present invention the solid mass transport rate is maximized and thus the transport time minimized, by providing means for determining the minimum dilution required to maximize the solid mass transport rate. Such means generally comprises a valve controlling the flow of dilution water into the mixing chamber and a pressure gauge for ascertaining the fluid pressure at the pump outlet, i.e. the pump head. By fully opening the valve to provide a maximum flow rate for the dilution water and then gradually throttling the flow of the dilution water while monitoring the pressure gauge, the minimum pump head may be ascertained. When the pump head is at a minimum, the dilution required to maximize the solid mass transport rate is also minimized.

In addition to oxygenating the slurry, the surface aspirator or oxygenation means of the present invention may also be used to establish a convective flow in the pooled slurry for maintaining the solid waste in suspension. It has been found that a velocity of flow in excess of one half foot per second will insure that the suspended solids will remain in suspension due to gentle bottom scouring. Accordingly, the jet may be inclined relative to a surface of the slurry at an angle selected to provide a velocity of flow above the minimum required to maintain the solids in suspension.

While the oxygenation means or surface aspirator of the present invention finds particular utility in a system for storing and treating agricultural animal waste, the principles of the present invention also find utility in the general field of liquid waste treatment. For example, the surface aspirator herein disclosed may be advantageously utilized, in treating pools of liquid waste commonly known as aeration lagoons and oxidation ditches. In that connection, the surface aspirator may be mounted on flotation means located at selected positions on the surface of the pool.

BRIEF DESCRIPTION OF THE DRAWINGS

FIG. 3 is a partial cross sectional view taken substantially along lines III—III of FIG. 2 and illustrates the configuration of an oxygenation apparatus embodying the features of the present invention;

FIG. 4 is a graph illustrating the effect of the motive jet travel distance on the oxygen transfer performance of a free jet discharging at 45° angle onto the surface of a tank of water;

FIG. 5 is a diagrammatic view of an alternative form of a storage trough for use in the system illustrated in FIG. 1;

FIG. 9 is a perspective view illustrating an alternative embodiment of the apparatus shown in FIG. 2;

FIG. 10 is a side elevational view of the apparatus illustrated in FIG. 9;

FIG. 11 is a plan view of an oxygenation ditch utilizing the apparatus of FIG. 9; and FIG. 12 is a sectional view taken substantially along line XII—XII of FIG. 11.

DETAILED DESCRIPTION OF CERTAIN PREFERRED EMBODIMENTS

Figure 2:
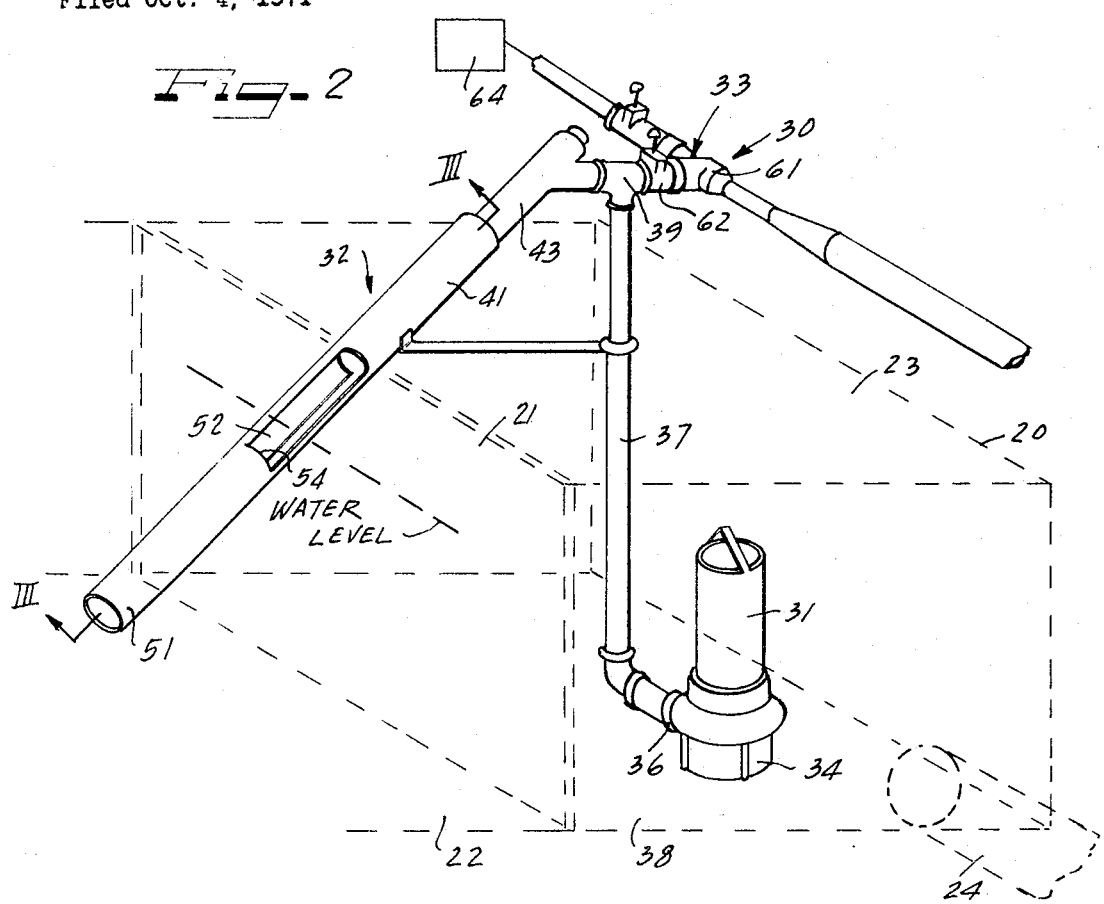
FIG. 2 is an enlarged view of a portion of the system shown in FIG. 1 and illustrates a unitary apparatus for mixing, deodorizing and transporting a slurry of animal waste suspended in water.
Figure 1:
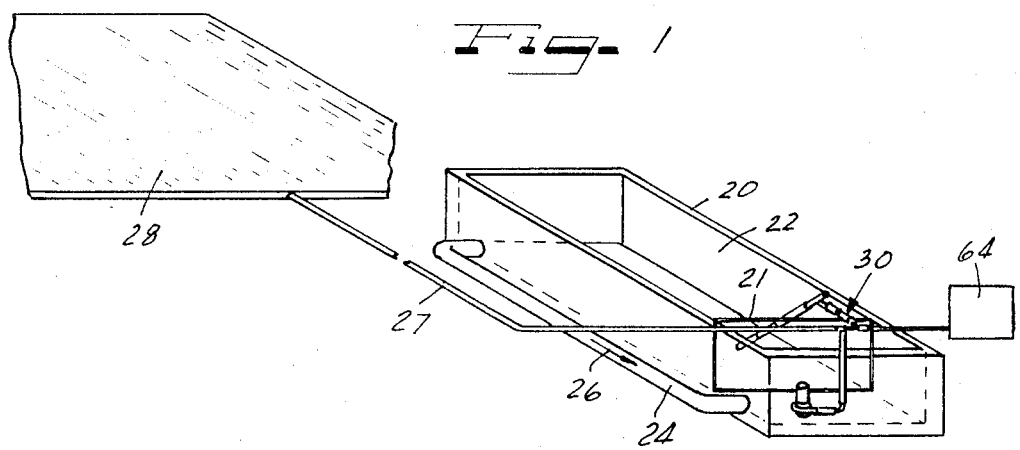
FIG. 1 is a diagammatic illustration of a system embodying the features of the present invention for storing and treating animal waste.
Figure 6:
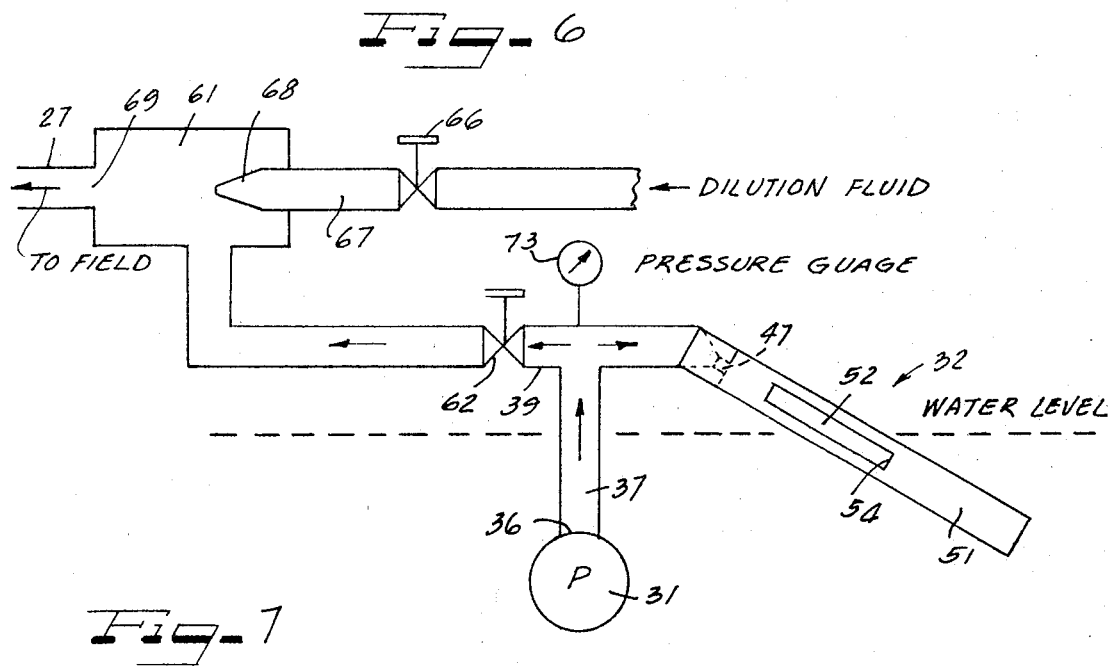
FIG. 6 is a diagrammatic illustration of the hydraulic circuitry employed in the apparatus shown in FIG. 2.

Referring to the drawings, and first particularly referring to FIGS. 1 and 2, an animal waste storage and treatment system, constructed in accordance with the principles of the present invention, generally comprises means forming a storage basin or trough 20 in which a slurry of animal waste and water is contained. When the present invention is applied to an agricultural feeding lot or barn, the collection trough or basin may be disposed below a floor of the feed lot area with a grate covering the trough and forming floor slots through which animal waste passes into the trough. One example of such a feed lot on which test of the present invention were conducted included a building sized to contain 680 hogs, with each hog having an average weight of about 150 pounds and producing a daily waste load equivalent to a town having a population of approximately 1800. A 50,000 gallon capacity waste collection trough extended along the entire length of the building and daily received an estimated 900 gallons of waste material from the animals housed in the building.

In order to enable circulation of the waste slurry for maintaining the solids suspended in the water, a wall or barricade 21 extends transversely of the trough 20 near one end thereof to divide the trough into separate sections 22 and 23, respectively. A recycle conduit 24 extending exteriorly of the trough communicates the collection section 22 with a pumping section 23, thereby forming a closed loop circulation path through which the slurry may be circulated, as indicated by arrow 26.

Periodically, a portion of the slurry is removed from the collection trough 20 and hydraulically transported via a conduit 27 to a spreading area or field 28. The animal waste slurry is then spread or sprayed onto the field 28 at a rate sufficiently low to prevent puddling, thereby enabling absorption of the waste into the ground without producing obnoxious odors or other undesirable conditions. Since the surface irrigation of the slurry onto the spreading field 28 is not normally accomplished at a rate equal to the rate of production of the waste, it is necessary to store the waste in the collection trough 20.

In accordance with the principles of the present invention, the odor of the liquid waste stored in the trough 20 is controlled by selective oxygenation or aeration of the slurry. The aeration oxygenation inhibits the production of malodorous gases and vapors by inhibiting anaerobic microbial metabolism in the slurry. However, since the animal waste slurry may be stored in a collection trough disposed within a feeding building, excessive foam created by the aeration process may contaminate feeding trays disposed adjacent to the waste collection trough. In order to ascertain an optimum balance between the quantity and frequency of aeration required to accomplish a positive odor control without excessive foaming, tests were conducted with the example described hereinabove. In addition to the test building, there were several other buildings similar to the test building, thereby enabling a comparison of the odor produced by the stored animal waste in the test building and in the other buildings. The deodorization tests were conducted until a stable condition was reached, as indicated by two or more weeks without change in the odor or foaming conditions, or the test was terminated due to a lack of deodorization or foaming problems. The animals contained within the test building produced a waste loading of 255 pounds of biochemical oxygen demand for a five day interval ($BOD_5$) per day. A summary of the test results is shown in the following table:

| Test | Oxygen, lbs./day | Circulation period, hours | Deodorizing intensity, lbs. oxygen/ lbs. $BOD_5$-hour | Remarks |
|---|---|---|---|---|
| 1 | 13 | 8 | 0.003 | No odor reduction. |
| 2 | 96 | 2 | 0.18 | Odor controlled; foaming problem. |
| 3 | 3 | 2 | 0.006 | Foam controlled; odors develop. |
| 4 | 16 | 2 | 0.03 | Foam and odors controlled. |
| 5 | 80 | 8 | 0.04 | Do. |

Accordingly, it was ascertained that a deodorizing intensity, expressed as pounds of oxygen per hour per pound $BOD_5$ per day, in excess of 0.01 provided sufficient odor control, whereas a deodorizing intensity rate in excess of 0.1 caused foaming problems.

It is also contemplated by the present invention to provide a unitary apparatus 30 for circulating the slurry around the closed flow path, deodorizing the slurry by oxygenating the same and hydraulically transporting the slurry at a maximum solid transport rate to the spreading field 28.

As illustrated in FIGS. 2 and 3, the unit 30 generally comprises a submersible pump 31, oxygenating means, generally indicated at 32 and hydraulic circuit means, generally indicated at 33 for diluting and transporting the slurry to the spreading area 28. The submersible pump 31 has a screened inlet 34 adapted to receive fluid in an outlet 36 through which pressurized fluid passes to an upstanding pipe 37. The pump 31 may be supported on a floor 38 of the pumping section 23 or otherwise mounted to receive fluid from the pumping section. A T 39 at an upper end of the pipe 37 directs the pump output flow to first and second flow paths, with the first flow path including the oxygenating means 32 and with the second flow path directing fluid to the spreading area 28.

In accordance with the principles of the present invention, the oxygenating means 32 comprises a tube 41 having internal threads 42 formed at one end portion thereof for attachent to a pipe section 43 extending from the T 39. Disposed within the tube 41 adjacent an upper end portion thereof is a hollow block 44 forming a nozzle 46 having a reduced diameter throat section 47 forming an outlet 48 through which pressurized fluid from the pump 31 passes in the form of a high velocity jet stream. As illustrated in FIG. 3, the nozzle outlet 48 is positioned to direct the jet stream toward a surface of the slurry, indicated by the dot dashed line, and is spaced above the surface or water level.

In tests conducted with a free jet discharging at a 45° angle onto the surface of a pool of water, it was ascertained that the motive jet travel distance or the spacing between the water level and the nozzle outlet 48 effected the oxygen transfer rate of the jet stream. Referring to FIG. 4, wherein is shown a graph having the jet travel distance, expressed as multiple of the nozzle throat diameter $d$ as an abscissa and relative oxygen transfer as an ordinate, the oxygen transfer rate substantially increases as the jet travel distance exceeds a distance of 5 times the nozzle throat diameter, as shown by a curve 50. With a jet travel ditsance 30 times the nozzle throat diameter, the oxygen transfer rate, expressed as oxygen transfer per horsepower-hour is substantially twice the rate obtained with conventional aspirators, which usually are spaced no further than 5 times the throat diameter from the pond surface. In a preferred embodiment, the jet travel distance, A, is in a range of 15 to 20 times the nozzle throat diameter, $d$.

It is also contemplated by the present invention to provide an aspirator or mixing tube having an inlet in axially spaced alignment with the nozzle outlet 48 and disposed below the water level so that the jet stream aspirates an admixture of surface fluid and ambient atmosphere into the mixing tube. Accordingly, the tube 41 of the oxygenating means 31 extends outwardly beyond the nozzle 47 and has an aspirator tube section 51 disposed to be below the normal water level maintained within the collecting trough section 22. A pair of diametrically opposed, axially elongated windows 52 formed within the tube 41 form web portions 53 supporting the aspirator tube section 51 in axially spaced alignment with the nozzle 47. An inlet for the aspirator section 51 is formed by a lower terminal edge 54 of the windows 53, which also form openings through which the admixture of surface fluid and ambient atmosphere enters the aspirator tube under the educement of the jet stream.

By aspirating an admixture of ambient atmosphere and surface water into the mixing tube section 51, the transfer of oxygen is substantially enhanced in comparison to a free jet or a free jet in combination with an aspirator tube into which only ambient atmosphere is pumped by the jet stream. In comparative tests, it was ascertained that the surface aspirator of the present invention including an aspirating tube having an inlet disposed below the fluid surface provided an oxygen transfer rate per unit of energy expended substantially 40% above that of a free jet having a similar jet travel distance.

In one example of the oxygenating means of the present invention, the aspirator tube section 51 was formed with an internal diameter $c$ of approximately 3 times the nozzle throat diameter $d$ and with an axial length in the range of 30 to 40 times the nozzle throat diameter. Excellent results were obtained when the inlet of the aspirator tube 51 was positioned a distance in the range of 5 to 6 times the nozzle throat diameter below the water level and the jet stream, which functions as a motive liquid to aspirate the ambient atmosphere and the surface liquid into the aspirator tube, was supplied with a pressure in the range of 8 to 10 p.s.i.g.

Referring now to FIGS. 2, 6, 7 and 8, the hydraulic circuit means forming the second flow path for selectively directing the slurry to the spreading field 28 includes a mixing chamber 61 into which fluid flows from the pump outlet via the T 39 and a flow control valve 62. A pressurized source 64 of a dilution fluid, such as water, communicates with the mixing chamber 61 via a second flow control valve 66 in a conduit line 67 having a nozzle 68 through which the dilution fluid enters the mixing chamber. In that manner, the mixing chamber 61 functions as an eductor with the motive fluid being the pressurized dilution fluid and the secondary fluid being the animal waste slurry discharged from the pump outlet 36. The diluted slurry exits from the mixing chamber or eductor 61 through an outlet port 69 and is transported via the transport line 27 to the field 28.

It should be noted that water containing high suspended solids concentrations, such as a slurry of animal waste, behaves in a manner similar to plastic fluids when the solids concentrations are above certain critical levels. Often, by diluting the solids concentrations, the solids mass transport rate may be increased. For example, for a given pipe size, a slurry containing 10% suspended solids may flow at a rate of 5 gallons per minute to the pipe for a given pump head. When that slurry is diluted to a 5% solids concentration, the total line flow may increase to 15 gallons per minute. Thus, by doubling the water content of the slurry, a 50% increase in the solid mass flow rate is achieved. Since it is impractical for an ultimate user of the system of the present invention to determine the percentage of solids in the slurry whenever it is desired to hydraulically transport a portion of the slurry to the spreading field, it is contemplated by the present invention to provide a simple method for determining the minimum dilution required to maximize the solid mass transport rate of the slurry.

Figure 7:
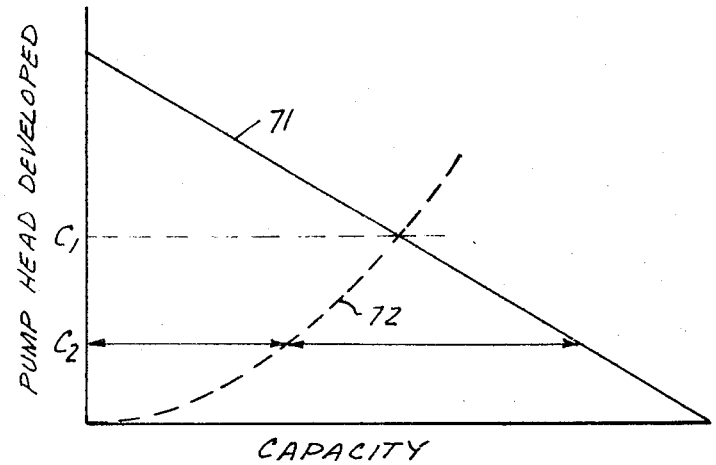
FIG. 7 is a graph depicting the relationship between the developed pump head and the pump capacity, in solid lines, and also illustrating the nozzle head capacity curve, in dashed lines, of the oxygenating apparatus of the present invention.
Figure 8:
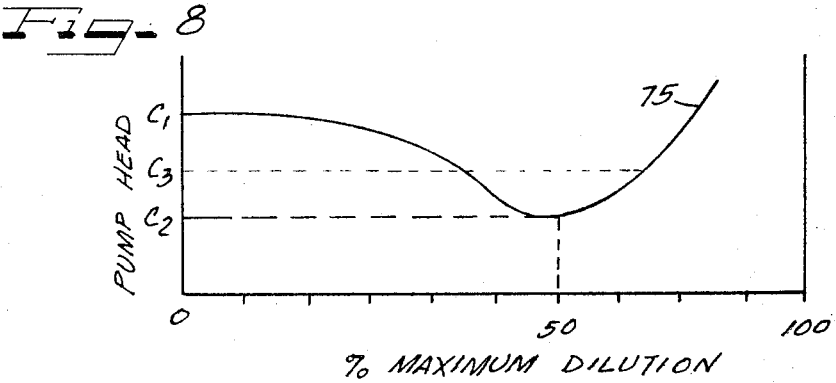
FIG. 8 is a graph showing the relationship between the pump head and the percent maximum dilution of a slurry hydraulically transported by the pump of the apparatus diagrammatically illustrated in FIG. 6.

As illustrated in FIG. 7, the total pump flow of the pump 31 follows a head-capacity curve 71 of the pump 31 and that portion of the pump flow passing through the nozzle 47 follows the nozzle head-capacity curve 72. During normal operation, the flow control valve 62 is closed so that the total pumped flow passes through the nozzle 47, and thus, the pump head is at a pressure $C_1$ corresponding to the pressure where the pump head capacity curve crosses the nozzle head-capacity curve.

During a transport operation, whenever the valve 62 is opened to direct a portion of the slurry to the field 28, the pumped flow is proportioned between the two separate flow paths with the flow to the mixing chamber 61 being equal to the difference between the pump capacity and the nozzle capacity for a given pump head. An optimum operating condition exists whenever the flow to the mixing chamber 31 is maximized, which occurs when the pump head is at a minimum when fluid is flowing to both of the flow paths. In the graph of FIG. 7, the minimum pump head is indicated at $C_2$.

In order to enable convenient adjustment of the diluation fluid flow rate for achieving a maximum mass transport rate, the unit 30 includes a pressure gauge 73 sensing and indicating the pump output pressure or pump head.

A user of the system of the present invention may conveniently maximize the mass transfer flow rate by initially fully opening the valve 66 to supply dilution fluid to the ejector nozzle 68 at a maximum flow rate with the transport valve 62 being closed. The transport valve is then fully opened so that the pump head will assume some value, such as $C_3$. The optimum dilution search procedure then involves following the search trajectory, as illustrated by line 75 in FIG. 8, by gradually closing the valve 66 to throttle the flow of dilution fluid to the mixing chamber 61 until the minimum pump head, $C_2$, is ascertained. The flow rate of the dilution fluid is then maintained at that level until the desired quantity of the slurry is transported to the field.

From the above description, it should be noted that the present invention provides a system for deodorizing stored animal waste which are periodically transported and spread on a field to complete the treatment of the waste material. The system of the present invention utilizes a single unitary apparatus for mixing the slurry of waste material to maintain solid waste in suspension, for oxygenating the slurry to deodorize the same and for transporting a portion of the slurry at a dilution rate selected to maximize the mass transport of the waste to the field. The unit 30 provides a simple and economical means for accomplishing the objectives of the present invention and for rendering the utilization of the system practical to farmers and other ultimate users. In addition to those advantages and the advantages inherent in deodorizing the slurry, the system also denitrifies the waste, thereby enabling a farmer to apply the waste material in higher quantity to crops. Swine and poultry waste is very high in nitrogen content, and unless the waste material is denitrified, it cannot be applied directly to crops which are consumed by the animals. Thus, the system enables complete recycling of the waste material.

As illustrated in FIG. 1, the system may be applied to an existing, elongated rectangular collection trough, however, improved efficiencies may be obtained in new systems by forming the collection trough as a "race track" oval, as shown in FIG. 5. The oval configuration of the collection trough 80 inherently forms a closed loop around which the slurry may be circulated at a velocity selected to assure that the solid waste material remains in suspension, thereby eliminating any necessity for an external recycle line to complete the closed path. If desired, the units 30 may be utilized in pairs with each unit being disposed at the head of alternate ones of the straight sections 81, 82 and directed in the same direction around the flow path, as indicated by arrows 82, 82.

Referring now to FIGS. 9 through 12, inclusive, it is contemplated by the present invention that the oxygenation means or surface aspirator 32 described hereinabove may be utilized to aerate lagoons or oxygenation ditches, as at 85 in systems other than that described hereinabove. Structural elements of the embodiment of the present invention as illustrated in FIGS. 9 through 12, inclusive, which are similar to those described hereinabove are identified with like reference numerals to which a prime has been added.

In order to position the oxygenation means 32' at a proper, fixed elevation with respect to a surface of the lagoon, as indicated by the dashed line 86, means for supporting the oxygenation means comprise a floating base. In the illustrated embodiment, the floating base includes a pair of floatable pontoons 87, 87 interconnected in a spaced apart relationship by structs 88. Four support arms 89 extending upwardly and inwardly from opposite ends of the struts 88 support a pump motor 91 above the pontoons 87 and thus above the water level 86. An output shaft 92 of the pump motor 91 through a conduit 93 which is also supported by the arms 89 to a pump unit 94, which is disposed beneath the pontoons for receiving fluid and forcing the same upwardly through the conduit. The oxygenation unit 32 supported at the proper elevation relative to the water level 86 at the end of a branch line 96 communicating the pump outlet to the nozzle 47' via the conduit 93, thereby to supply pressurized fluid to the nozzle for producing a high velocity jet stream.

In accordance with the principles of the present invention, the nozzle outlet 48 is disposed to be above the normal water line 86 with the inlet 54' of the aspirator or mixing tube 51' being supported in axial alignment with the nozzle outlet and below the normal water line.

Periodically the nozzle 47 may require cleaning due to an accumulation of material within the nozzle bore. Accordingly, in accordance with one feature of the present invention, means for cleaning the nozzle without removing the aerator from the lagoon 85 are provided. That means include a rod 101 disposed in axially spaced alignment with the nozzle 47 and sized relative thereto to be closely received therewithin for removing accumulated deposits whenever the rod enters the nozzle bore. The rod 101 is mounted for reciprocation between the stored position, as illustrated in FIG. 10, wherein the rod is spaced from the nozzle and a cleaning position wherein the rod enters the nozzle. Power means, such as a solenoid 102 selectively reciprocates the rod between the alternate positions, thereby enabling periodic, powered cleaning of the nozzle to maintain its intended flow characteristics in efficiency.

As illustrated in FIGS. 11 and 12, the oxygenation ditch 85 may be formed in the ground with floating partitions 103, 103 disposed parallel to a sidewall 104 of the ditch and having ends 106, 106 terminating inward'y of ends of the ditch 107. In that manner, the partitions 103 form closed flow loops around which the slurry or other fluid contained within the ditch may be circulated by convective forces transferred to the fluid by the jet stream. Also, a plurality of flow paths may be formed in a single ditch by dividing the ditch into sections with an additional floating wall as at 108 extending substantially the entire length of the ditch.

Although those versed in the art may suggest various minor modifications, it should be understood that I wish to embody within the scope of the patent warranted hereon all such modifications as reasonably and properly come within the scope of my contribution to the art.

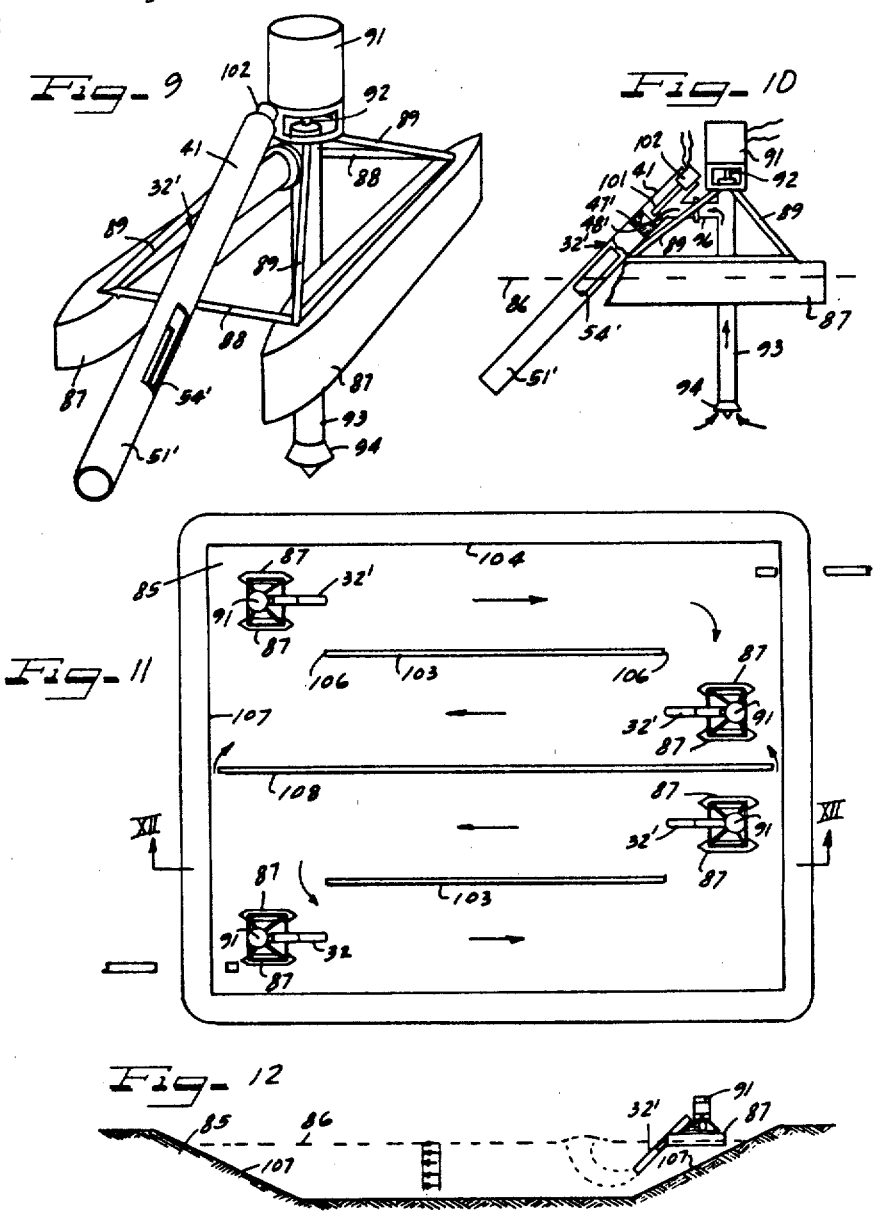

I claim as my invention:

1. A system for deodorizing and treating a slurry of animal waste suspended in a pool of fluid comprising:
   pump means having an outlet and an inlet with said inlet being adapted to receive a slurry of animal waste suspended in a pool of fluid;
   means forming a first flow path receiving fluid from said pump outlet and comprising
      oxygenation means receiving pressurized flow from said pump outlet and producing a jet stream directed to educe ambient atmosphere into the slurry;
   means forming a second flow path for transporting the slurry to a point of use and comprising
      valve means controlling the flow from said pump outlet to said second flow path,
      a source of pressurized dilution fluid,
      means forming a mixing chamber through which fluid from said pump outlet and said source of pressurized dilution fluid flows, and
      second valve means selectively controlling the flow of the dilution fluid to said mixing chamber,
   whereby the concentration of suspended solids in the fluid flowing through said second flow path to a point of use may be controlled to maximize the transport rate of the slurry.

2. A system as defined in Claim 1 and further characterized by said oxygenation means comprising:
   a first tube having an outlet through which fluid flows from said pump outlet in the form of a high velocity stream;
   means forming an aspirator tube having an inlet; and
   means supporting said aspirator tube with said inlet in axially spaced alignment with said first tube outlet and forming openings through which ambient atmosphere and surface fluid may enter said inlet.

3. A system as defined in Claim 1 and further characterized
   means forming an elongated tank for containing the slurry;

wall means dividing said tank into separate sections;
conduit means communicating said separate sections with each other,
said pump inlet receiving fluid from one of said sections, and
said oxygenation means being positioned to direct a high velocity stream into the other one of said sections.

4. A system as defined in Claim 1 and further characterized
means forming an oval trough for containing the slurry; and
said oxygenation means being positioned to direct the high velocity stream in a direction to circulate the slurry around said oval trough.

5. A system as defined in Claim 1 and further characterized
means forming an elongated trough for containing the slurry;
wall means extending axially of said trough and forming a closed loop circulating path within said trough; and
said oxygenation means being positioned to direct the high velocity stream in a manner to circulate the slurry around the circulation path.

6. Apparatus for oxygenating a slurry of animal waste suspended in a pool of fluid comprising
a nozzle tube having a nozzle outlet for issuing a high velocity liquid stream from one end thereof,
an aspirator tube,
means fixedly supporting said nozzle and aspirator tubes in axially spaced end-to-end alignment with one another to form an aspirator air opening therebetween,
means forming a rod sized relative to said nozzle outlet to be closely received therewithin,
means mounting said rod in axial alignment with said nozzle outlet for selective reciprocation between a stored position wherein said rod is axially spaced from said nozzle outlet and a cleaning position wherein said rod enters said nozzle outlet for cleaning the same, and powered means for selectively moving said rod between the alternate positions thereof.

7. A method of dissolving gaseous oxygen in a body of liquid comprising the steps of
conducting pressurized liquid through the throat of a nozzle to produce a high velocity liquid stream,
directing the stream downwardly through an oxygen-containing gas environment to the surface of the liquid body, and
positioning an elongated open-ended aspirator tube within the liquid body below the surface thereof and in axial alignment with the stream for receiving the stream at the upper end of said tube and discharging same from the lower end of the tube,
the axial length of said aspirator tube being about 30 to 40 times the diameter of said throat,
the inside diameter of said aspirator tube being approximately 3 times the diameter of said throat, and
the pressure of the liquid at said throat being approximately 8 to 10 p.s.i.g.

8. A method of dissolving gaseous oxygen in a body of liquid comprising the steps of
conducting pressurized liquid through the throat of a nozzle to produce a high velocity liquid stream,
directing the liquid stream downwardly through an oxygen-containing gas environment to the surface of the liquid body for entraining oxygen-gas with said liquid stream, and
positioning an elongated open-ended aspirator tube within the liquid body below the surface thereof and in axial alignment with the liquid stream for receiving said liquid stream, along with the oxygen-containing gas and the liquid from the surface of said liquid body entrained therewith, at the upper end thereof,
said nozzle being spaced from the surface of said liquid body to provide a jet travel distance of said liquid stream of at least about 5 times the diameter of the throat of said nozzle, the upper open end of said aspirator tube being sufficiently close to the surface of said liquid body and the diameter of said aspirator tube being sufficiently greater than the diameter of the throat of said nozzle such that substantially all of the liquid in said liquid stream and substantially all of the oxygen-containing gas and surface liquid entrained therewith enters said upper open end of said aspirator tube.
the relationship between the velocity of said liquid stream and the diameter and length of said aspirator tube being such that substantially all of the liquid stream, the oxygen-containing gas and the surface liquid entering the upper open end of said aspirator tube are conducted completely through said aspirator tube and discharged from the lower open end thereof.

9. The method as defined in claim 8 in which said aspirator tube has an axial length of about 30 to 40 times the diameter of the throat of said nozzle to provide thorough mixing of the liquid stream, the oxygen-containing gas and the surface liquid before the admixture thereof is discharged from the lower open end of said aspirator tube.

10. The method as defined in claim 8 in which the inside diameter of said aspirator tube is approximately 3 times the diameter of said throat.

11. The method as defined in claim 8 in which said nozzle is spaced from the surface of said liquid body a distance equal to between about 15 to 20 times the diameter of said throat.

12. The method as defined in claim 8 in which the pressure of the liquid at said throat is approximately 8 to 10 p.s.i.g.

References Cited
UNITED STATES PATENTS

| | | | |
|---|---|---|---|
| 3,271,304 | 9/1966 | Valdespino et al. | 210—221 X |
| 3,295,326 | 1/1967 | White | 261—121 R |
| 1,286,775 | 12/1918 | Rein et al. | 210—194 |
| 3,532,219 | 10/1970 | Valdespino | 210—242 |
| 3,330,486 | 7/1967 | Semple | 239—419.5 |
| 2,138,133 | 11/1938 | Betzler | 169—15 |

FRANK A. SPEAR, JR., Primary Examiner

P. A. HRUSKOCI, Assistant Examiner

U.S. Cl. X.R.

210—15, 197, 242; 261—DIG. 75

UNITED STATES PATENT AND TRADEMARK OFFICE
CERTIFICATE OF CORRECTION

PATENT NO. : 3,840,457  Page 1 of 5
DATED : October 8, 1974
INVENTOR(S) : George E. Wilson It is certified that error appears in the above—identified patent and that said Letters Patent is hereby corrected as shown below:

Figures 1 through 12 as shown on the attached sheets should be added, but will apply to the Grant Only.

Signed and Sealed this

Twenty-sixth Day of October 1982

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 3,840,457
DATED : October 8, 1974
INVENTOR(S) : George E. Wilson

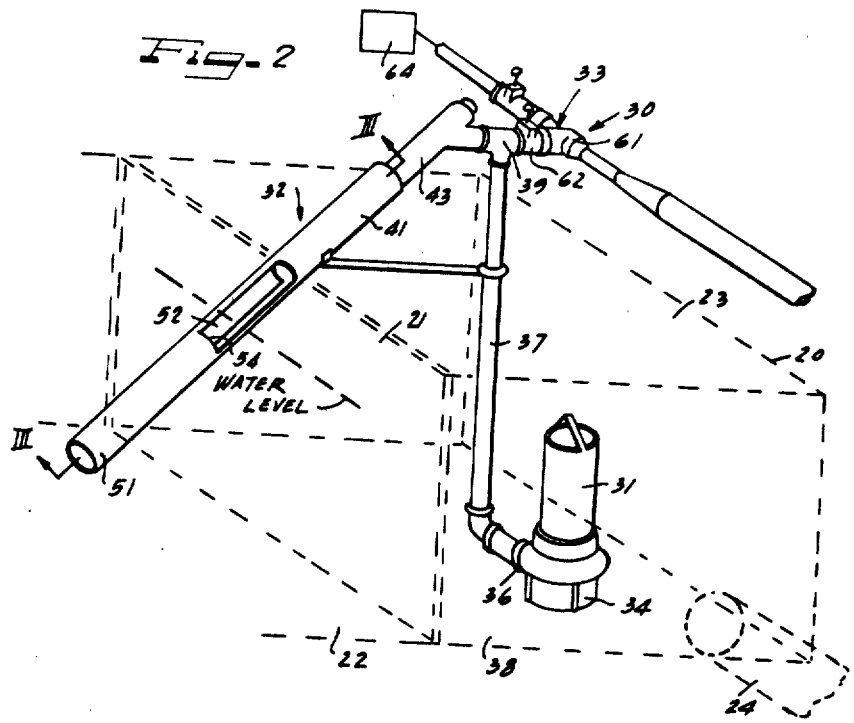

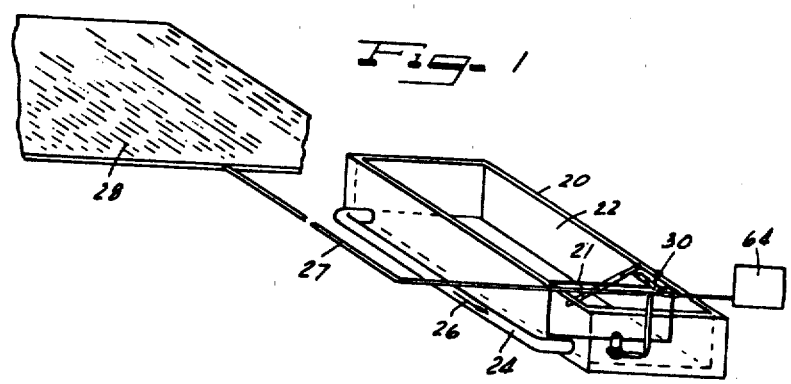

UNITED STATES PATENT AND TRADEMARK OFFICE
CERTIFICATE OF CORRECTION

PATENT NO. : 3,840,457
DATED : October 8, 1974
INVENTOR(S) : George E. Wilson

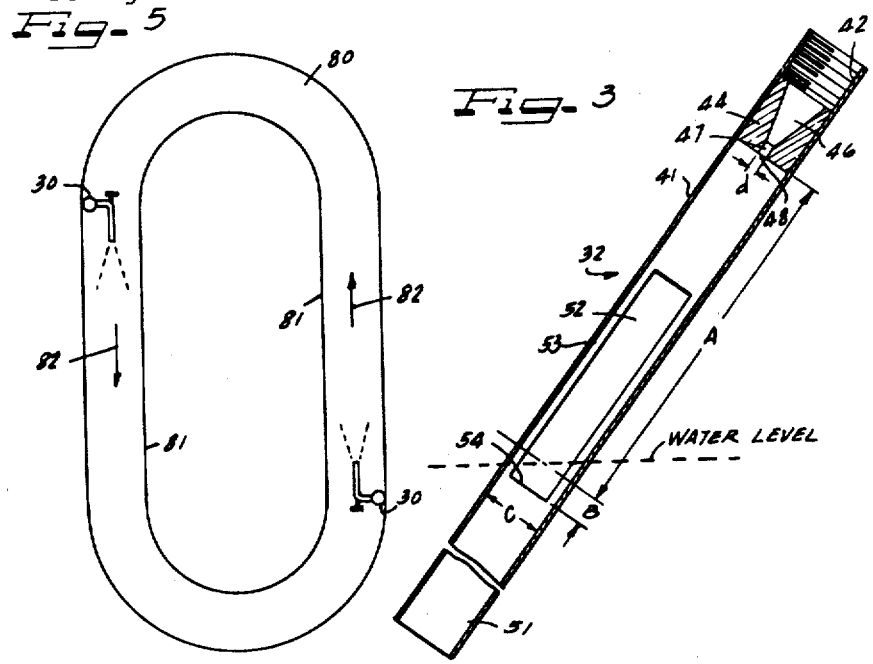

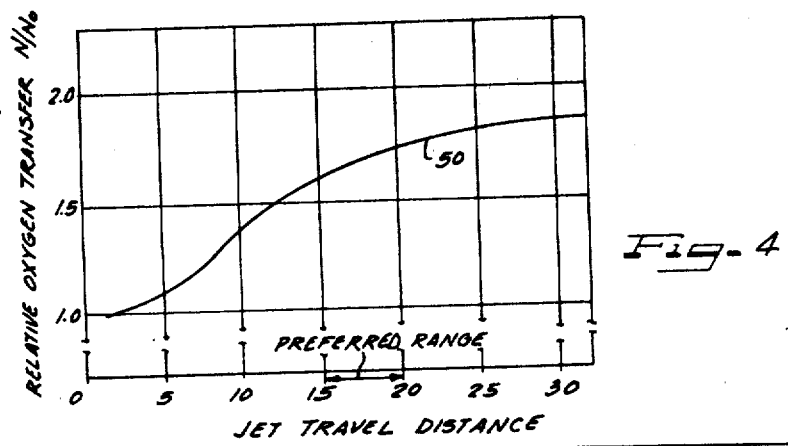

UNITED STATES PATENT AND TRADEMARK OFFICE
CERTIFICATE OF CORRECTION

PATENT NO. : 3,840,457
DATED : October 8, 1974
INVENTOR(S) : George E. Wilson

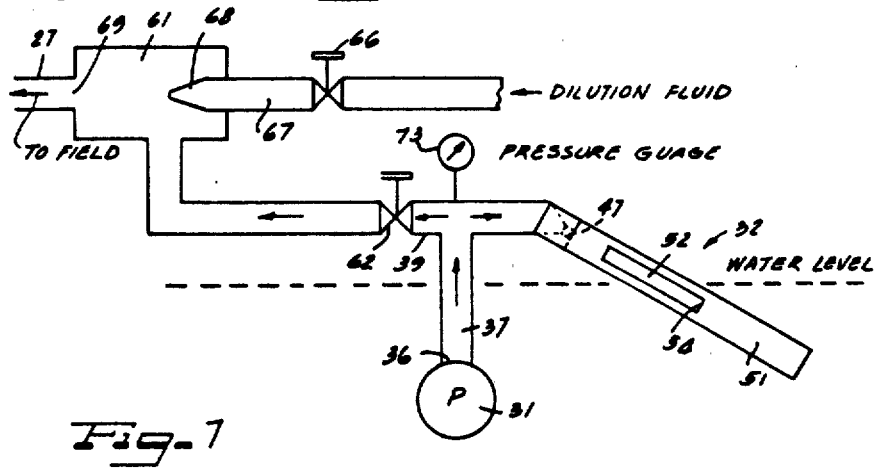

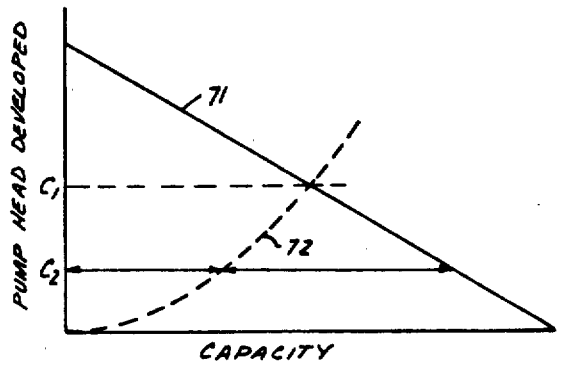

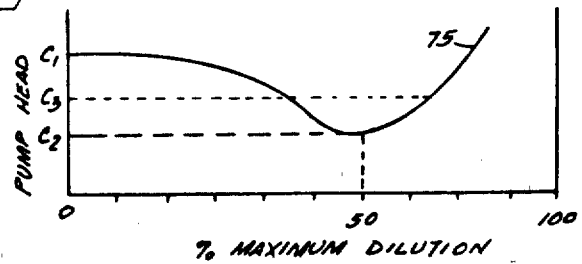

UNITED STATES PATENT AND TRADEMARK OFFICE
CERTIFICATE OF CORRECTION

PATENT NO. : 3,840,457
DATED : October 8, 1974
INVENTOR(S) : George E. Wilson

Page 5 of 5